(12) United States Patent
Kwon et al.

(10) Patent No.: US 9,001,755 B2
(45) Date of Patent: Apr. 7, 2015

(54) TRANSMISSION METHOD OF DOWNLINK SIGNAL IN WIRELESS COMMUNICATION SYSTEM AND TRANSMISSION APPARATUS THEREFOR

(75) Inventors: Yeong Hyeon Kwon, Anyang-si (KR); So Yeon Kim, Anyang-si (KR); Sung Ho Moon, Anyang-si (KR); Jae Hoon Chung, Anyang-si (KR); Seung Hee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 352 days.

(21) Appl. No.: 13/391,774

(22) PCT Filed: Aug. 23, 2010

(86) PCT No.: PCT/KR2010/005582
§ 371 (c)(1),
(2), (4) Date: May 9, 2012

(87) PCT Pub. No.: WO2011/025195
PCT Pub. Date: Mar. 3, 2011

(65) Prior Publication Data
US 2012/0218952 A1 Aug. 30, 2012

Related U.S. Application Data

(60) Provisional application No. 61/236,126, filed on Aug. 23, 2009.

(51) Int. Cl.
*H04W 4/00* (2009.01)
*H04L 5/00* (2006.01)

(52) U.S. Cl.
CPC .............. *H04L 5/0094* (2013.01); *H04L 5/001* (2013.01); *H04L 5/0044* (2013.01); *H04L 5/0053* (2013.01); *H04L 5/0087* (2013.01)

(58) Field of Classification Search
None
See application file for complete search history.

(56) References Cited

U.S. PATENT DOCUMENTS 8,503,388 B2 8/2013 Ishii et al.
2010/0195614 A1* 8/2010 Nimbalker et al. ........... 370/330
(Continued)

FOREIGN PATENT DOCUMENTS

CN 102113242 A 6/2011
KR 10-2008-0081537 A 9/2008
(Continued)

OTHER PUBLICATIONS

Huawei, "Remaining issues on PDCCH for semi-persistent scheduling", 3GPP TSG-RAN-WG1 meeting #54bis, R1-083691, Prague, Czech Republic, Sep. 2008, 4 pages.
(Continued)

*Primary Examiner* — Minh-Trang Nguyen
(74) *Attorney, Agent, or Firm* — Birch, Stewart, Kolasch & Birch, LLP

(57) ABSTRACT

The present invention provides a method for a base station to transmit a downlink signal in a wireless communication system, the method comprising: allocating a resource to a downlink signal; and transmitting the downlink signal using the allocated resource. In the downlink signal transmission method and apparatus thereof, a resource for transmitting a Physical Downlink Shared Channel (PDSCH) among the downlink signals is allocated from a specific OFDM symbol that is fixed within a subframe.

16 Claims, 11 Drawing Sheets

(56) References Cited

U.S. PATENT DOCUMENTS

2010/0227569 A1* 9/2010 Bala et al. .................. 455/73
2011/0194514 A1 8/2011 Lee et al.

FOREIGN PATENT DOCUMENTS

WO WO 2008/105418 A1 9/2008
WO WO 2010/048178 A1 4/2010

OTHER PUBLICATIONS

LG Electronics, "Resource Allocation and Downlink Control Channel Structure for Relay Backhaul Link", 3GPP TSG RAN WG1 meeting #57, R1-092115, San Francisco, USA, May 2009, 7 pages.
Samsung, "PDSCH-to-RE mapping robust against CCFI reception errors", 3GPP TSG RAN WG1 meeting #51bis, R1-0780042, Sevilla, Spain, Jan. 2008, 3 pages.
Huawei, "Remaining issues on PDCCH for semi-persistent scheduling", 3GPP TSG RAN WG1 Meeting #54, R1-083032, Jeju, South Korea, Aug. 18-22, 2008, pp. 1-4.
Samsung, "PDSCH-to-RE mapping robust against CCFI reception errors", 3GPP TSG RAN WG1 Meeting #52, R1-080684, Sorrento, Italy, Feb. 11-15, 2008, pp. 1-3.
Catt et al., "Design of DL Control Channel for LTE-A with Carrier Aggregation", 3GPP TSG RAN WG1 meeting #58, R1-093530, Shenzhen, China, Aug. 24-28, 2009, 4 pages.
Huawei, "PDCCH design for carrier aggregation", 3GPP TSG RAN WG1 Meeting #56, R1-090815, Athens, Greece, Feb. 9-13, 2009, 5 pages.
LG Electronics Inc., "PDSCH Starting Symbol Indication in Cross-Carrier Scheduling", TSG-RAN WG1 Meeting #60bis, R1-102364, Beijing, China, Apr. 12-16, 2010, 3 pages.
NTT DOCOMO, INC., "UL ACK/NACK resource allocation for DL semi-persistent scheduling", 3GPP TSG RAN WG2 #62, R2-0824485 (resubmission of R2-081857), Kansas City, MO, USA, May 5-9, 2008, 4 pages.
Panasonic, "PDCCH coding and mapping for carrier aggregation", 3GPP TSG-RAN WG1 Meeting #56bis, R1-091168, Seoul, Korea, Mar. 23-27, 2009, pp. 1-5.

* cited by examiner

FIG. 2
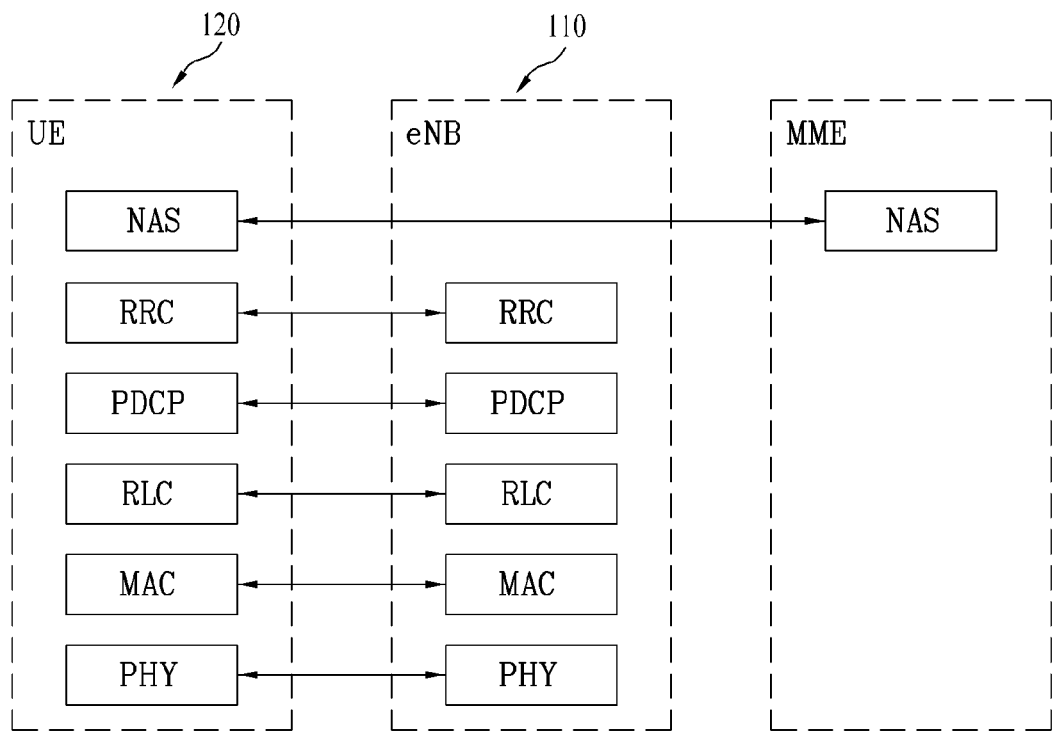
(a) control-plane protocol stack
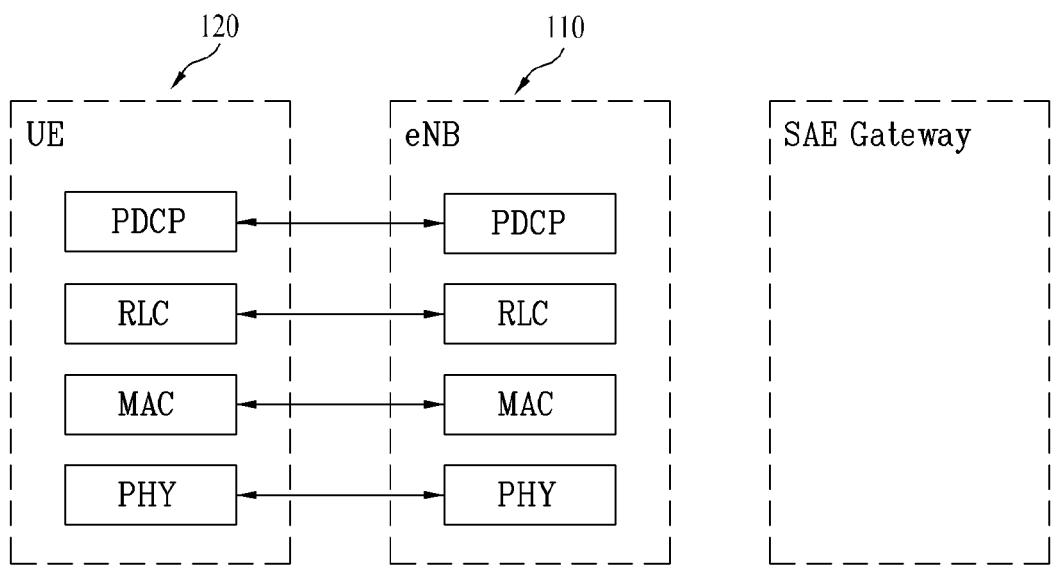
(b) user-plane protocol stack FIG. 8
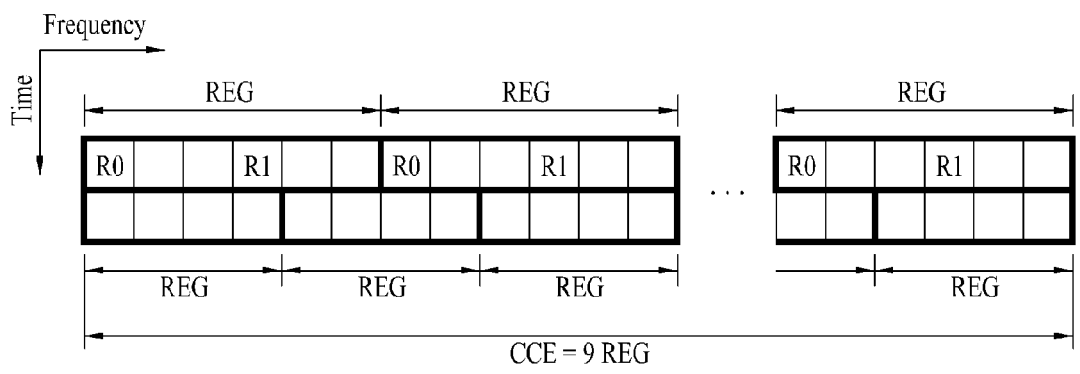
(a) 1TX or 2TX
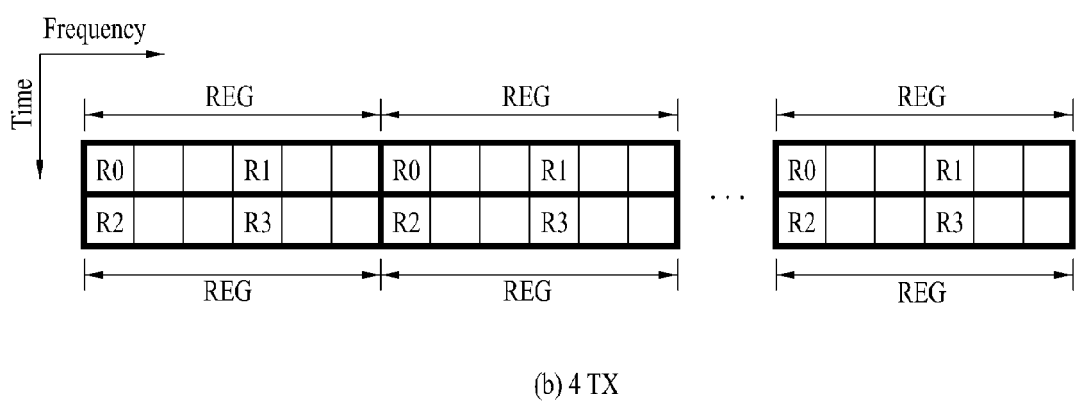
(b) 4 TX

TRANSMISSION METHOD OF DOWNLINK SIGNAL IN WIRELESS COMMUNICATION SYSTEM AND TRANSMISSION APPARATUS THEREFOR

CROSS REFERENCE TO RELATED APPLICATIONS

This application is the National Phase of PCT/KR2010/005582 filed on Aug. 23, 2010, which claims priority under 35 U.S.C. §119(e) to U.S. Provisional Application No. 61/236,126 filed on Aug. 23, 2009, all of which are hereby expressly incorporated by reference into the present application.

TECHNICAL FIELD

The present invention relates to a wireless communication system, and more particularly, to a method of transmitting a downlink signal at a base station in a wireless communication system.

BACKGROUND ART

As an example of a mobile communication system to which the present invention is applicable, a $3^{rd}$ Generation Partnership Project (3GPP) Long Term Evolution (LTE) communication system will be schematically described. FIG. 1 is a diagram showing a network structure of an Evolved Universal Mobile Telecommunications System (E-UMTS) as a mobile communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "$3^{rd}$ Generation Partnership Project; Technical Specification Group Radio Access Network".

Referring to FIG. 1, the E-UMTS mainly includes a User Equipment (UE) 120, base stations (or eNBs or eNode Bs) 110a and 110b, and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.25, 2.5, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQest (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include the AG and a network node or the like for user registration of the UE. The AG manages mobility of a UE on a Tracking Area (TA) basis. One TA includes a plurality of cells.

Although radio communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

Recently, the standardization of the subsequent technology of the LTE is ongoing in the 3GPP. In the present specification, the above-described technology is called "LTE-Advanced" or "LTE-A". The LTE system and the LTE-A system are different from each other in terms of system bandwidth. The LTE-A system aims to support a wideband of a maximum of 100 MHz.

DISCLOSURE

Technical Problem

An object of the present invention is to provide a signal transmission method capable of allocating Physical Downlink Shared Channel (PDSCH) resources to a downlink signal regardless of a change in a Physical Downlink Data Channel (PDDCH) size in a method of transmitting a downlink signal.

The technical problems solved by the present invention are not limited to the above technical problems and those skilled in the art may understand other technical problems from the following description.

Technical Solution

The object of the present invention can be achieved by providing a method of transmitting a downlink signal at a base station in a wireless communication system including allocating resources to the downlink signal, and transmitting the downlink signal using the allocated resources, wherein resources for transmitting a physical downlink shared channel (PDSCH) of the downlink signal are allocated from a fixed specific OFDM symbol within a subframe.

The fixed specific OFDM symbol may be a fourth OFDM symbol within the subframe, and the resources for the PDSCH may be allocated to OFDM symbols within the subframe in a time forward order.

The fixed specific OFDM symbol may be a last OFDM symbol within the subframe, and the resources for transmitting the PDSCH are allocated to OFDM symbols within the subframe in a time backward order.

When a user equipment receives and decodes a data physical channel for an arbitrary downlink carrier, a base station (or a cell or a relay node) may inform the UE (or a relay node as a downlink reception subject) of the number of control channel transmission symbols of the carrier, or the location or the symbol index of a physical resource mapping start symbol of the data physical channel of the carrier through higher layer radio resource control (RRC) signaling on a carrier-specific and/or UE-specific or carrier-specific and/or base station-specific (or cell-specific or relay node-specific) basis.

In order to solve the above problems, an apparatus for transmitting a downlink signal in a wireless communication system includes a processor configured to allocate resources to the downlink signal, and a radio frequency (RF) module configured to transmit the downlink signal using the allocated resources. Resources for transmitting a physical downlink shared channel (PDSCH) of the downlink signal are allocated from a fixed specific OFDM symbol within a subframe.

Advantageous Effects

According to the embodiments of the present invention, since uncertainty in resource allocation of a PDSCH due to a change in PDCCH size can be solved, it is possible to prevent errors in data reception due to the change in PDCCH size.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a diagram showing a control plane and a user plane of a radio interface protocol architecture between a User Equipment (UE) and an Evolved Universal Terrestrial Radio Access Network (E-UTRAN) based on a 3$^{rd}$ Generation Partnership Project (3GPP) radio access network standard;

FIG. 8 is a diagram showing a resource unit used to configure a control channel;

BEST MODE

Figure 1:
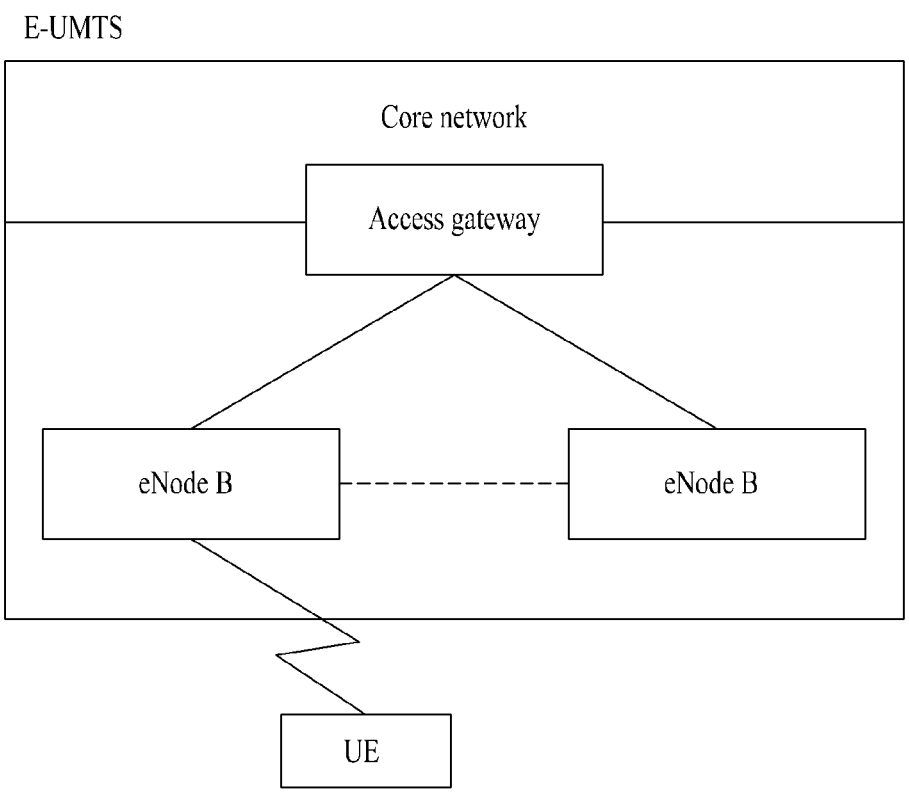
FIG. 1 is a diagram showing a network structure of an Evolved Universal Mobile Telecommunications System (E-UMTS) as an example of a mobile communication system.

The configuration, operation and other features of the present invention will be understood by the embodiments of the present invention described with reference to the accompanying drawings. The following embodiments are examples of applying the technical features of the present invention to a 3$^{rd}$ Generation Partnership Project (3GPP) system.

Hereinafter, a system in which a system band uses a single component carrier is referred to as a legacy system or a narrowband system. A system in which a system band includes a plurality of component carriers and one or more component carriers are used as a system block of a legacy system is referred to as an evolved system or a wideband system. The component carrier used as the legacy system block has the same size as the system block of the legacy system. The sizes of the remaining component carriers are not specially limited. However, in order to simplify a system, the size of the remaining component carriers may be determined based on the size of the system block of the legacy system. For example, a 3GPP LTE system and a 3GPP LTE-A system are evolved from a legacy system.

Based on the above definition, in the present specification, a 3GPP LTE system is called an LTE system or a legacy system. A user equipment (UE) which supports an LTE system is called an LTE UE or a legacy UE. A 3GPP LTE-A system is called an LTE-A system or an evolved system. A UE which supports an LTE-A system is called an LTE-A UE or an evolved UE.

Although, for convenience, the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

FIG. 2 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of a higher layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A Radio Resource Control (RRC) layer located at the bottom of a third layer is defined only in the control plane and is responsible for control of logical, transport, and physical channels in association with configuration, re-configuration, and release of Radio Bearers (RBs). The RB is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located above the RRC layer performs functions such as session management and mobility management.

One cell of the eNB is set to use a bandwidth such as 1.25, 2.5, 5, 10, 15 or 20 MHz to provide a downlink or uplink transmission service to UEs. Different cells may be set to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink shared channel (SCH) for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
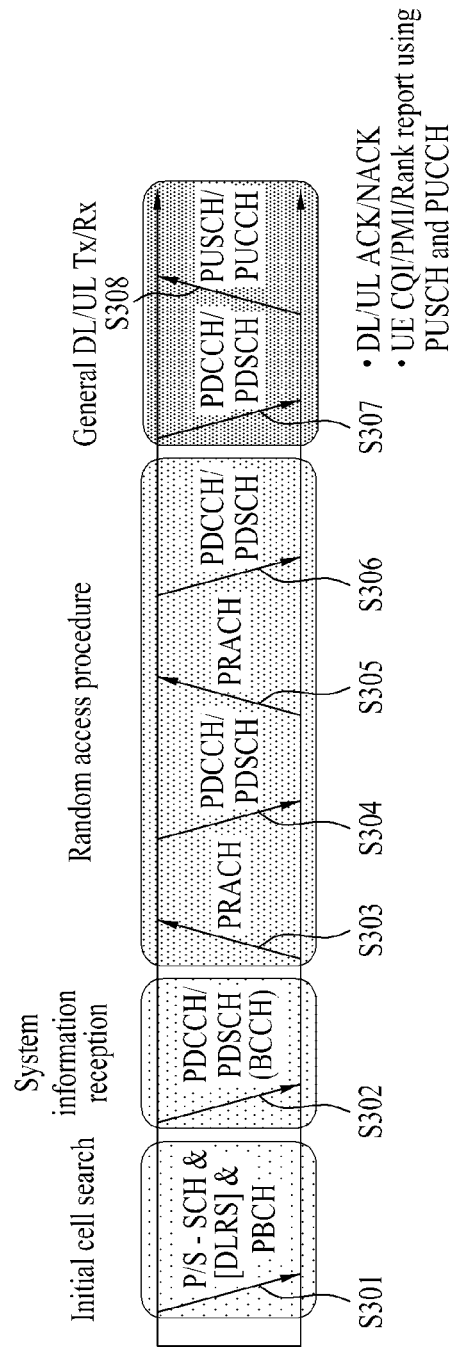
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with a base station (eNB) when power is turned on or the UE enters a new cell (S301). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE which completes the initial cell search may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. In this case, the UE may transmit a specific sequence through a Physical Random Access Channel (PRACH) as a preamble (S303 and S305), and receive a response message of the preamble through the PDCCH and the PDSCH corresponding thereto (S304 and S306). In the case of contention-based RACH, a contention resolution procedure may be further performed.

The UE which performs the above procedures may perform PDCCH/PDSCH reception (S307) and Physical Uplink Shared Channel PUSCH)/Physical Uplink Control Channel (PUCCH) transmission (S308) as a general uplink/downlink signal transmission procedure. The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 4:
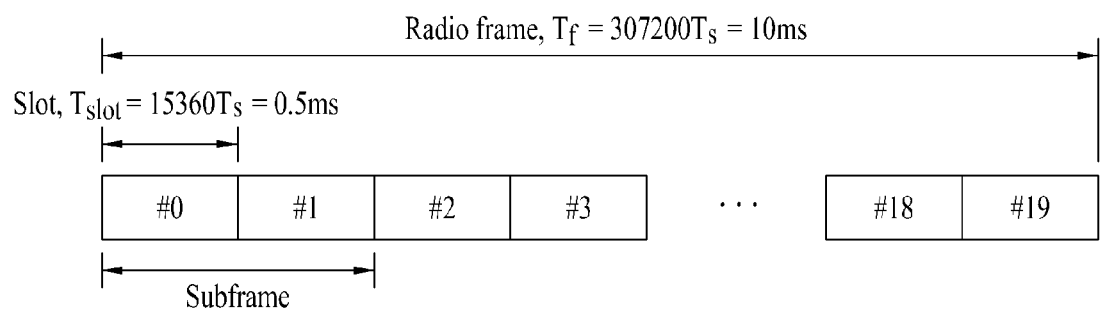
FIG. 4 is a diagram showing the structure of a radio frame used in a Long Term Evolution (LTE) system.

FIG. 4 is a diagram showing the structure of a radio frame used in a Long Term Evolution (LTE) system.

Referring to FIG. 4, the radio frame has a length of 10 ms ($327200 \cdot T_s$) and includes 10 subframes with the same size. Each of the subframes has a length of 1 ms and includes two slots. Each of the slots has a length of 0.5 ms ($15360 \cdot T_s$). $T_s$ denotes a sampling time, and is represented by $T_s=1/(15 \text{ kHz} \times 2048)=3.2552 \times 10^{-8}$ (about 33 ns). Each slot includes a plurality of OFDM symbols in a time domain, and includes a plurality of resource blocks (RBs) in a frequency domain. In the LTE system, one RB includes 12 subcarriers×7(6) OFDM symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM symbols included in the slot may be variously changed.

Figure 5:
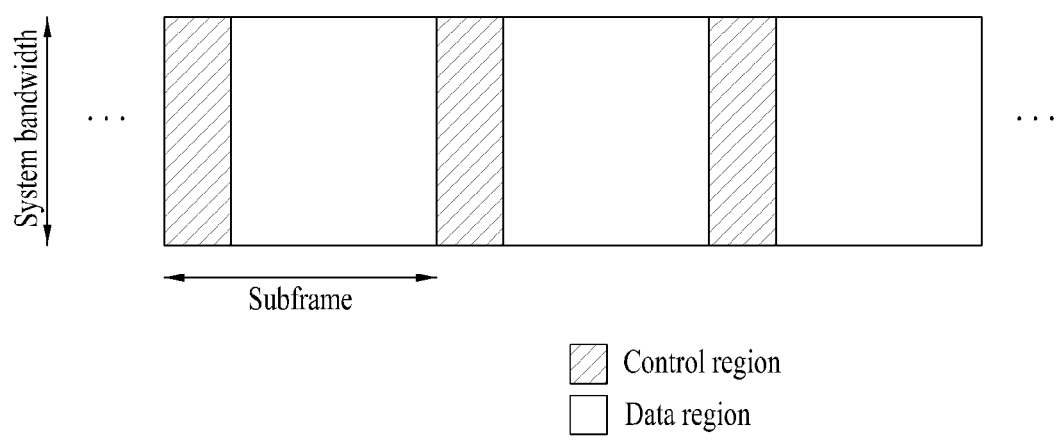
FIG. 5 is a diagram showing the functional structure of a downlink radio frame.

FIG. 5 is a diagram showing the functional structure of a downlink radio frame.

Referring to FIG. 5, a downlink radio frame includes 10 subframes having the same length. In the 3GPP LTE system, the subframe is defined as a basic time unit of packet scheduling for the entire downlink frequency. Each subframe is divided into a control region for transmission of scheduling information and other control channels and a data region for transmission of downlink data. The control region starts from a first OFDM symbol of the subframe and includes one or more OFDM symbols. The size of the control region may be independently set for each subframe. The control region is used to transmit an L1/L2 (layer 1/layer 2) control signal. The data region is used to transmit downlink traffic.

Figure 6:
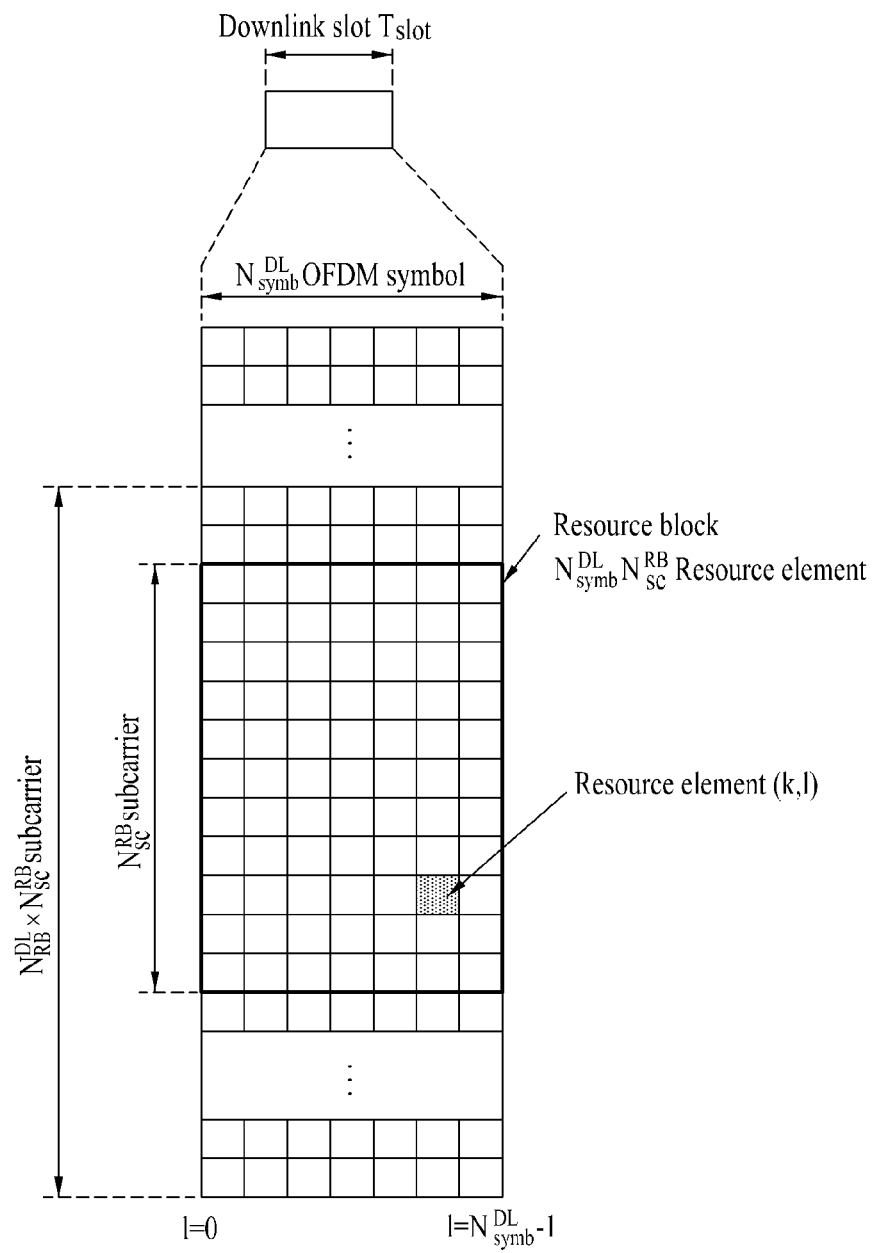
FIG. 6 is a diagram showing a resource grid of a downlink slot.

FIG. 6 is a diagram showing a resource grid of a downlink slot.

Referring to FIG. 6, a downlink slot includes OFDM symbols in a time domain and RBs in a frequency domain. Since each RB includes a subcarrier, the downlink slot includes subcarriers in the frequency domain. Although FIG. 3 shows the case in which the downlink slot includes seven OFDM symbols and the RB includes 12 subcarriers, the present invention is not limited thereto. For example, the number of OFDM symbols included in the downlink slot may be changed according to the length of a cyclic prefix (CP).

Each element of the resource grid is referred to as a resource element (RE) and one RE is indicated by one OFDM symbol index and one subcarrier index. One RB includes plural REs. The number ( ) of RBs included in the downlink slot depends on a downlink transmission bandwidth set in a cell.

Figure 7:
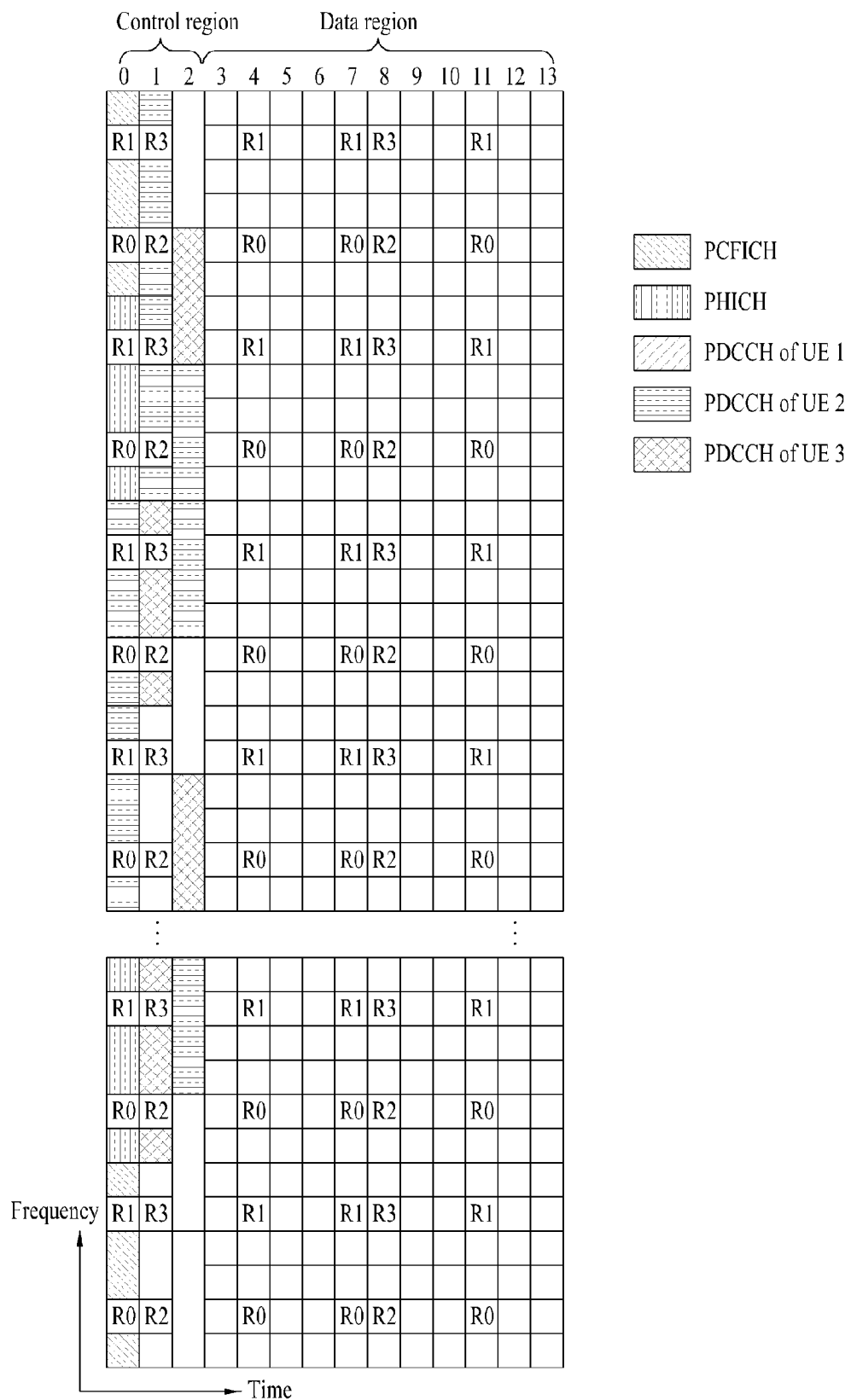
FIG. 7 is a diagram showing a control channel included in a control region of a subframe.

FIG. 7 is a diagram showing a control channel included in a control region of a subframe.

Referring to FIG. 7, a subframe includes 14 OFDM symbols. The first to third OFDM symbols are used as a control region and the remaining 13 to 11 OFDM symbols are used as a data region, according to subframe settings.

In FIG. 7, R1 to R4 denote reference signals (RS) for antennas 0 to 3. The RS is fixed to a constant pattern within a subframe regardless of the control region and the data region. A control channel is allocated to resources, to which the RS is not allocated, in the control region, and a traffic channel is also allocated to resources, to which the RS is not allocated, in the control region. Examples of the control channel allocated to the control region include a Physical Control Format Indicator Channel (PCFICH), a Physical Hybrid-ARQ Indicator Channel (PHICH), a Physical Downlink Control Channel (PDCCH), etc.

The Physical Control Format Indicator Channel (PCFICH) informs the UE of the number of OFDM symbols used for the PDCCH per subframe. The PCFICH is located at a first OFDM symbol and is set prior to the PHICH and the PDCCH. The PCFICH includes four Resource Element Groups (REGs) and the REGs are dispersed in the control region based on a cell identity (ID). One REG includes four resource elements (REs). The structure of the REG will be described in detail with reference to FIG. 8. The PCFICH has a value of 1 to 3 and is modulated using a Quadrature Phase Shift Keying (QPSK) scheme.

The Physical Hybrid-ARQ Indicator Channel (PHICH) is used to transmit HARQ ACK/NACK for uplink transmission. The PHICH includes three REGs and is scrambled on a cell-specific basis. ACK/NACK is indicated by one bit and spreading is performed with a spreading factor (SF) of 2 or 4 and is repeated three times. A plurality of PHICHs may be mapped to the same resources. The PHICH is modulated using binary phase shift keying (PBSK) scheme.

The Physical Downlink Control Channel (PDCCH) is allocated to the first n OFDM symbols of a subframe. Here, n is an integer of 1 or more and is indicated by a PCFICH. The PDCCH includes one or more Control Channel Elements (CCEs), which will be described in greater detail below. The PDCCH informs each UE or a UE group of information associated with resource allocation of a Paging Channel (PCH) and a Downlink-Shared Channel (DL-SCH), both of which are transport channels, uplink scheduling grant, HARQ information, etc.

The paging channel (PCH) and the downlink-shared channel (DL-SCH) are transmitted through a PDSCH. Accordingly, the eNB and the UE transmit and receive data through the PDSCH except for specific control information or specific service data.

Information indicating to which UE (one or a plurality of UEs) data of the PDSCH is transmitted and information indicating how the UEs receive and decode the PDSCH data are transmitted in a state of being included in the PDCCH. For example, it is assumed that a specific PDCCH is CRC-masked with a Radio Network Temporary Identity (RNTI) "A", and information about data transmitted using radio resource (e.g., frequency location) "B" and transmission format information (e.g., transmission block size, modulation scheme, coding information, or the like) "C" is transmitted via a specific subframe. In this case, one or more UEs located within a cell monitor a PDCCH using its own RNTI information, and if one or more UEs having "A" RNTI are present, the UEs receive the PDCCH and receive the PDSCH indicated by "B" and "C" through the information about the received PDCCH.

FIGS. 8(a) and 8(b) show resource units used to configure a control channel. In particular, FIG. 8(a) shows the case in which the number of transmission antennas of an eNB is 1 or 2 and FIG. 8(b) shows the case in which the number of transmission antennas of an eNB is 4. A reference signal (RS) pattern is changed according to the number of transmission antennas, but a method of setting a resource unit associated with the control channel is not changed.

Referring to FIGS. 8(a) and 8(b), the basic resource unit of the control channel is an REG. The REG includes four neighboring REs except for an RS. The REG is indicated by a thick line in the figure. A PCFICH and a PHICH includes four REGs and three REGs, respectively. A PDCCH is configured in control channel elements (CCEs) and one CCE includes nine REGs.

A UE is set to confirm $M^{(L)}$ ($\geq L$) CCEs which are arranged consecutively or in a specific rule, in order to determine whether a PDCCH including L CCEs is transmitted to the UE. The UE may consider a plurality of L values, for PDCCH reception. A set of CCEs which should be confirmed by the UE for PDCCH reception is referred to as a search space. For example, an LTE system defines the search space as shown in Table 1.

TABLE 1

| Type | search space $S_k^{(L)}$ Aggregation lever L | Size [in CCEs] | Number of PDDCH candidate $M^{(L)}$ | DCI formats |
|---|---|---|---|---|
| UE-Specific | 1 | 6 | 6 | 0, 1, 1A, 1B, 2 |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

A CCE aggregation level L denotes the number of CCEs configuring a PDCCH, $S_k^{(L)}$ denotes a search space of the CCE aggregation level L, and $M^{(L)}$ denotes the number of candidate PDCCHs which should be monitored in the search space of the aggregation level L.

The search space may be divided into a UE-specific search space in which only access of a specific UE is allowed and a common search space in which access of all UEs located in a cell is allowed. A UE monitors common search spaces having CCE aggregation levels of 4 and 8 and monitors UE-specific search spaces having CCE aggregation levels of 1, 2, 4 and 8. The common search space and the UE-specific search space may overlap.

In a PDCCH search space applied to an arbitrary UE with respect to each CCE aggregation level value, the location of a first CCE (having a smallest index) may differ between subframes according to UEs. This is referred to as PDCCH search space hashing.

Hereinafter, PDSCH resource mapping according to the present invention will be described.

Mapping of resources to a PDSCH may start subsequent to OFDM symbols mapped to a PDCCH.

However, the UE may be aware of the size of OFDM symbols used for the PDCCH after decoding of a physical control format indicator channel (PCFICH) is successfully performed. Accordingly, if errors occur in a process of decoding the PCFICH, for example, if a problem occurs in reception of the PCFICH, errors may occur in reading the location of the OFDM symbols allocated to the PDSCH.

Such errors which occur in reading the location of the OFDM symbols allocated to the PDSCH may cause errors in data reception.

Hereinafter, a conventional method will be described in greater detail.

One method of allocating transmission resources to OFDM symbols to be transmitted through a PDSCH is a frequency precedence mapping method. More specifically, mapping starts from a first OFDM symbol among OFMS symbols to which a PDCCH region, that is, a control region, is not allocated. After resources are allocated to a frequency domain of the first OFDM symbol, resources are allocated to a second OFDM symbol. Similarly, after resources are allocated to the frequency domain of the second OFDM symbol, resources are allocated to a third OFDM symbol. This process is repeated to allocate resources to the data region of the subframe.

Such a resource allocation method has a problem that a mapping start location is changed according to the used PDCCH size. The PDCCH size is indicated by a PCFICH.

In summary, in the conventional method, resources allocated to the PDSCH depend on the PDCCH size. The PDCCH size is changed according to decoding of the PCFICH. In a state in which data reception may be changed according to decoding of the PCFICH and the PDCCH size, if DL component carriers (CCs) on which a DL channel allocation PDCCH is transmitted and DL CCs on which a scheduled PDSCH is transmitted are different, errors of the scheduled PCFICH on the DL CCs and the DL channel allocation PDCCH are not completely bound and thus a HARQ buffer error corruption probability that information different from originally intended data of the PDSCH is input to a UE reception HARQ buffer is increased.

In order to solve such a problem, the present invention proposes the following schemes.

In a first scheme, a fixed symbol mapping scheme is used in mapping of physical resource to modulation symbols of a PDSCH.

In a second scheme, a parity bit for double checking a result of decoding a PCFICH is used.

In a third scheme, a start OFDM symbol, in which physical resources are mapped to modulation symbols of a scheduled PDSCH, or a PCFICH size is indicated through PDCCH DCI format transmission or higher layer RRC signaling as a DL CC-specific value transmitted on a PDCCH on a UE-specific or eNB-specific (cell-specific or RN-specific) basis.

First, the fixed symbol mapping scheme of the first scheme will be described.

The fixed symbol mapping scheme is a scheme of always starting resource mapping from a specific OFDM symbol location regardless of an actual PDCCH size. For example, in case of a system bandwidth greater than 1.4 MHz, the PDCCH size may not be greater than 3 OFDM symbols. Accordingly, the start point of PDSCH OFDM symbol mapping may be an arbitrary OFDM symbol except for the OFDM symbols allocated to the PDCCH in the same subframe among OFDM symbols.

In the present invention, mapping to modulation symbols having the following features may be performed.

In mapping to modulation symbols according to the present invention, a start OFDM symbol index is a specific symbol among always usable symbols regardless of an actual PDCCH size.

A fourth OFDM symbol may be used as a start OFDM symbol index. In addition, in case of a system bandwidth of 1.4 MHz, a start OFDM symbol index may be a fifth OFDM symbol. After mapping of resources to the start OFDM symbol index, mapping of resources to other OFDM symbol indexes in the same subframe is performed.

In case of a relay, possible OFDM symbol indexes may be restricted due to a transition gap of a hardware Tx/Rx mode. In this case, the range of the possible start OFDM symbol index may be restricted to OFDM symbols except for a guard symbol for preventing the Tx/Rx transition gap.

The possible OFDM symbol indexes having the above features are shown in Table 2.

TABLE 2

|  | Normal CP | Extended CP |
|---|---|---|
| UE-eNB: System BW >1.4 MHz | 3~13 | 3~11 |
| UE-eNB: System BW <=1.4 MHz | 4~13 | 4~11 |
| Relay-eNB: System BW >1.4 MHz, one OFDM guard | 3~12 or 4~13 | 3~10 or 4~11 |
| Relay-eNB: System BW <=1.4 MHz, one OFDM guard | 4~12 or 5~13 | 4~10 or 5~11 |
| Relay-eNB: System BW >1.4 MHz, two OFDM guard | 3~11 or 5~13 or 4~12 | 3~9 or 5~11 or 4~10 |
| Relay-eNB: System BW <=1.4 MHz, two OFDM guard | 4~11 or 6~13 or 5~12 | 4~9 or 6~11 or 5~10 |

An arbitrary OFDM symbol index may be selected from Table 2, for appropriate buffer management. However, preferably, a start location is a fixed OFDM symbol which is not influenced by a PDCCH, such as a fourth OFDM symbol of a subframe.

Such a symbol mapping scheme is equal to the conventional scheme except that PDSCH modulation symbols are additionally mapped to OFDM symbols if extra OFDM symbols are present between an OFDM symbol location where mapping of physical resources of the PDSCH modulation symbols starts and a PDCCH transmission OFDM symbol location which is dynamically determined through a PCFICH located on DL CCs on an eNB-specific or cell-specific basis after completely filling the subframe with OFDM symbols.

In additional mapping of the PDSCH modulation symbols which is possible due to the small number of PDCCH transmission symbols, the mapping order of the PDSCH modulation symbols to OFDM symbols may be defined in a time forward order or a time backward order while following the frequency precedence scheme of the Rel-8.

That is, additional mapping to OFDM symbols may be start at an OFDM symbol index which may be used first as a forward symbol index or an OFDM symbol index which may be lastly used as a backward symbol index.

Figure 9:
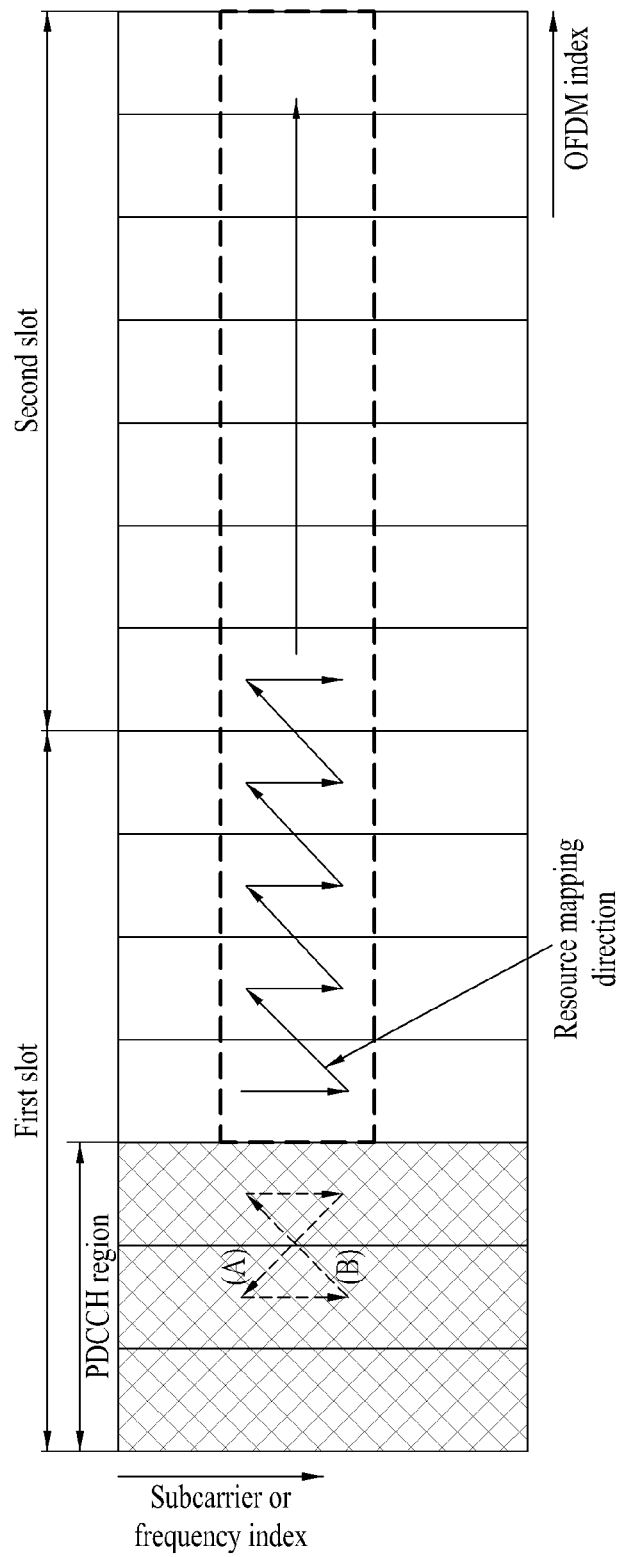
FIG. 9 is a diagram showing resource allocation to PDSCH data in a time forward direction according to the present invention.

FIG. 9 is a diagram showing an example of a mapping scheme in a time forward direction.

A fourth OFDM is selected as a start OFDM symbol index. The location of the start OFDM symbol index is fixed. In addition, the start OFDM symbol index is fixed regardless of the size of the PDCCH corresponding to the control region.

Mapping to the fourth OFDM symbol as the start OFDM symbol index is started. After mapping is started, mapping to next OFDM symbols is started in a time forward order. In the figure, mapping to a fifth OFDM symbol is performed. After mapping to the fifth OFDM symbol, mapping to a sixth OFDM symbol is performed. Such a process is repeated until mapping to a fourteenth OFDM symbol is performed. If mapping to the fourteenth OFDM symbol is completed, mapping to the subframe is completed. If OFDM symbols to which extra PDSCH modulation symbols are mapped are present prior to the fourth OFDM symbol, sequential mapping to the corresponding symbols is performed by applying the method of additionally mapping physical resources of modulation symbols of the PDSCH after the fourteenth OFDM symbol is finally mapped.

In contrast, modulation symbols may be mapped in a backward symbol index order.

A first OFDM symbol which is used for modulation symbol mapping may be a last OFDM symbol within a subframe. For example, mapping may start at the fourteenth OFDM symbol corresponding to the last symbol of a second slot.

Figure 10:
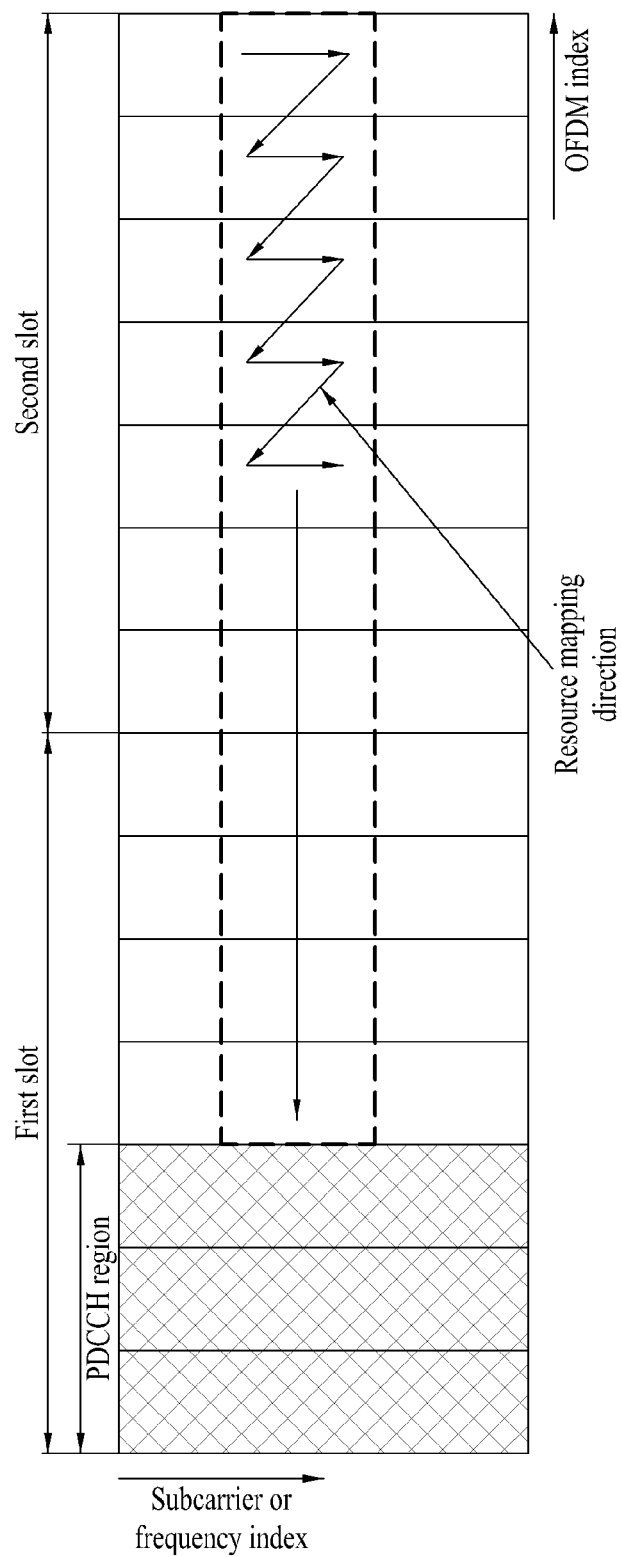
FIG. 10 is a diagram showing resource allocation to PDSCH data in a time backward direction according to the present invention.

FIG. 10 is an example of a mapping scheme in a time backward order.

A fourteenth OFDM symbol is selected as a start OFDM symbol index of symbol mapping. Similarly to the mapping method in the time forward order, the start OFDM symbol index is fixed regardless of the PDCCH size.

After mapping to the start OFDM symbol index is started, mapping to a thirteenth symbol is performed in a time backward order. After mapping to the thirteenth symbol is performed, mapping to a twelfth symbol is performed. This process is repeated to complete mapping to symbols in the subframe.

Other schemes may be considered, in addition to the case in which mapping starts from the last OFDM symbol of the subframe. Mapping to a second slot is always possible regardless of the configuration of the PDCCH. Thus, an eighth OFDM symbol which is a first symbol of the second slot may be used as a mapping start location. After mapping starts from the eighth OFDM symbol, mapping to the second slot may be performed in a time forward direction and mapping to the first slot is may be performed in a time forward direction, a time backward direction or a combination of the above-described mapping schemes. Alternatively, mapping to the second slot may be performed from the last OFDM symbol in a time backward direction and mapping to the first slot is may be performed in a time forward direction, a time backward direction or a combination of the above-described mapping schemes.

The mapping order of the OFDM symbols has been described above. In mapping of physical resources of the PDSCH modulation symbols proposed by the present invention, the mapping order in the frequency domain may be equal to that of the conventional 3GPP LTE standard. However, as the mapping order of the OFDM symbols is reversed, the mapping order may be opposed to that of the conventional 3GPP LTE standard.

Hereinafter, a scheme of using a parity bit for double checking the result of decoding the PCFICH will be described as the second scheme.

If the PCFICH can be accurately decoded, there is no need to mitigate dependence of PDSCH mapping on the PDCCH size. That is, if a mechanism for protecting the PCFICH from error is present, it is not necessary for the UE to apply a separate solution to a buffer corruption phenomenon generated when modulation symbols are stored in (input to) a soft buffer (or a HARQ reception buffer). Accordingly, hereinafter, a method of implementing the mechanism for protecting the PCFICH will be described.

The second scheme of the present invention is to prevent decoding error of the PCFICH.

As described above, the second scheme of the present invention uses the parity bit to double check the result of decoding the PCFICH as the mechanism for protecting the PCFICH. Since the PCFICH is currently used for all Rel-8 UEs and subsequent UEs thereof, the current PCFICH format may not be arbitrarily corrected. Accordingly, instead of correcting the current PCFICH, an additional mechanism for protecting the PCFICH may be provided by inserting an arbitrary codeword into an arbitrary physical resource region in the PHICH or PDCCH region for the purpose of protection against errors. That is, a series of symbol error check symbols may be transmitted through a PHICH or CRC check of a UE-specific PDCCH transmission resource region (that is, a UE-specific PDCCH search space) and/or a common PDCCH transmission resource region (that is, common search space) may be performed. Such error check sequence may include a PCFICH value and CRC information or only a CRC value. For example, an error check sequence may be uniquely set according to control information on a specific PCFICH, and (UE-specific or eNB-specific) CRC information or a specific value of control information on a PCFICH.

The operation of the UE having the PCFICH protection mechanism will now be described.

1) The UE monitors the PDCCH (resource allocation) on an indicated/assumed downlink carrier. Alternatively, the UE may have predefined allocation on one downlink carrier by persistent allocation. 2) The UE decodes a PCFICH value of a target downlink carrier. 3) The UE decodes a protective codeword from a PHICH or a PDCCH. 4) If a check sequence is successfully CRC-checked, since the UE is aware of a PDCCH size and a PDSCH mapping start OFDM symbol, the UE reads modulation symbols from the allocated resources.

Lastly, the third scheme of the present invention will be described.

The third scheme of the present invention indicates a DL-CC value through PDCCH DCI format transmission or higher layer RRC signaling on a UE-specific or eNB-specific basis such that the UE identifies an OFDM symbol index value, in which the mapping of physical resources of the PDSCH modulation symbols starts, on DL CCs (Downlink component carriers), on which the PDSCH is transmitted, described in the present invention or a PCFICH value, that is, the number of PDCCH transmission symbols determined on DL CCs on a UE-specific or eNB-specific basis, without decoding the PCFICH.

Alternatively, in indication of the PCFICH size through higher layer signaling, the PCFICH value or the PDSCH resource mapping start OFDM symbol index is more preferably indicated as common information of the carriers (that is, DL CCs) through RRC signaling as arbitrary higher layer signaling, instead of that the PCFICH size is indicated on a DL CC-specific basis. Although this is transmitted as a radio resource control (RRC) signal, this may be transmitted to the UE as a dynamic scheduling signal as necessary, as DCI transmission through the PDCCH.

That is, an RRC signal is used, since the RRC signal cannot be frequently changed, PCFICH change may be restricted. The PCFICH value may be flexibly transmitted as the DCI format, in order to flexibly change the PCFICH value and confirm the PCFICH value before all UEs begin to read packet symbols.

These values may be transmitted on the above-described cell-specific or UE-specific downlink CCs as individual control information or codewords thereof, as described above. As another example, one PDCCH DCI format may be defined to indicate the index value of the OFDM symbol location in which mapping of physical resources of PDSCH modulation symbols start or the PCFICH value on one, several or all CCs or a target CC having CRC protection.

Through the above-described methods, after the UE confirms that resource allocation of one downlink CC is present, the index value of the OFDM symbol location, in which mapping of physical resources of PDSCH modulation symbols starts, or the target PCFICH value may be obtained from the downlink CC in advance and may be used for authentication for DL CC PCFICH decoding.

Although an eNB or a cell is used as a downlink transmission subject in the present specification, the downlink transmission subject may include a relay node. Similarly, although a UE is used as a downlink reception subject in the present specification, the downlink reception subject may include a relay node.

Figure 11:
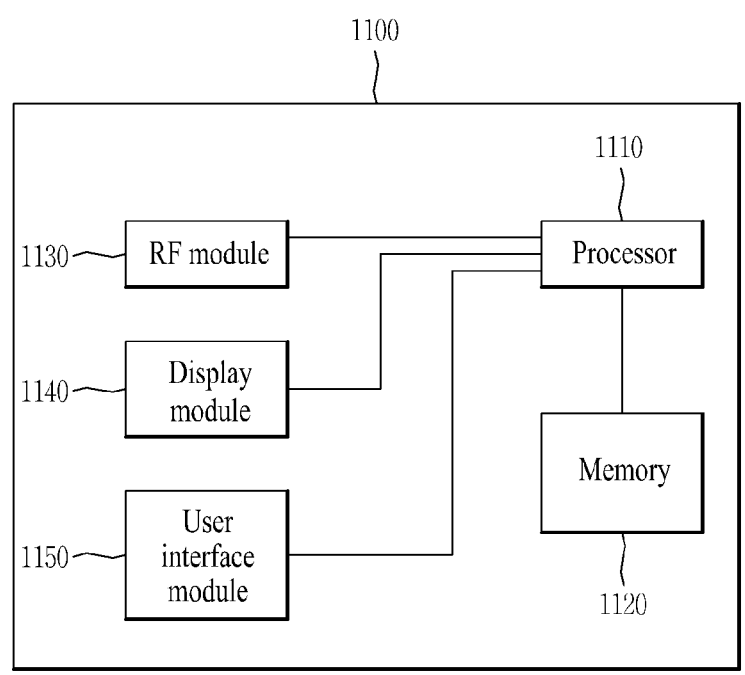
FIG. 11 is a diagram schematically showing the configuration of a base station according to the present invention.

FIG. 11 is a block diagram showing a transmitter/receiver according to an embodiment of the present invention. The transmitter/receiver may be a part of an eNB or a UE.

Referring to FIG. 11, a transmitter/receiver 1100 includes a processor 1110, a memory 1120, a Radio Frequency (RF) module 1130, a display module 1140 and a user interface module 1150. The transmitter/receiver 1100 is shown for convenience of description and some modules thereof may be omitted. In addition, the transmitter/receiver 1100 may further include necessary modules. In addition, some modules of the transmitter/receiver 1100 may be subdivided. The processor 1110 is configured to perform an operation of the embodiment of the present invention described with respect to the drawings. More specifically, if the transmitter/receiver 1100 is part of an eNB, the processor 1110 may perform a function for generating a signal and mapping the signal to a data region set within CCs. The processor 1110 of the transmitter 1100 which is part of the eNB generates a downlink signal and allocates a PDSCH of the downlink signal to a data region within the subframe. The processor 1110 controls allocation of resources, to which the PDSCH is allocated, from a fixed OFDM symbol within the subframe. In addition, the processor 1110 starts resource allocation at the fixed OFDM symbol and performs resource allocation in a time forward order or a time backward order.

The memory 1120 is connected to the processor 1110 so as to store an operating system, applications, program code, data and the like. The RF module 1130 is connected to the processor 1110 so as to perform a function for converting a baseband signal into a radio signal or converting a radio signal into a baseband signal. The RF module 1130 performs analog conversion, amplification, filtering and frequency up-conversion or inverse processes thereof. The RF module 1130 serves to transmit a downlink signal, to which resources are allocated, by the processor 1110. The display module 1140 is connected to the processor 1110 so as to display a variety of information. As the display module 1140, although not limited thereto, a known device such as a Liquid Crystal Display (LCD), a Light Emitting Diode (LED), or an Organic Light Emitting Diode (OLED) may be used. The user interface module 1150 is connected to the processor 1110 and may be configured by a combination of known user interfaces such as a keypad and a touch screen.

The above-described embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. Also, some constituent components and/or characteristics may be combined to implement the embodiments of the present invention. The order of operations disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

The above-mentioned embodiments of the present invention are disclosed on the basis of a data communication relationship between a base station and a user equipment. Specific operations to be conducted by the base station in the present invention may also be conducted by an upper node of the base station as necessary. In other words, it will be obvious to those skilled in the art that various operations for enabling the base station to communicate with the user equipment in a network composed of several network nodes including the base station will be conducted by the base station or other network nodes other than the base station. The term "Base Station" may be replaced with the terms fixed station, Node-B, eNode-B (eNB), or access point as necessary. The term "User Equipment (UE)" may also be replaced with the term subscriber station (SS) or mobile subscriber station (MSS) as necessary.

The embodiments of the present invention can be implemented by a variety of means, for example, hardware, firmware, software, or a combination thereof. In the case of implementing the present invention by hardware, the present invention can be implemented through application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to a signal transmission method and, more particularly, to a method of transmitting a downlink signal in a wireless communication system.

The invention claimed is:

1. A method for receiving a PDSCH (Physical Downlink Shared Channel) signal by a communication apparatus in a wireless communication system, comprising:
   receiving a RRC (Radio Resource Control) signal including information used for identifying a region from which the PDSCH signal is received;
   receiving a PDCCH (Physical Downlink Control Channel) signal including resource allocation information for the PDSCH signal; and
   receiving the PDSCH signal from a starting OFDM (Orthogonal Frequency Division Multiplexing) symbol of the region,
   wherein the PDCCH signal is received on a first downlink component carrier and the PDSCH signal is received on a second downlink component carrier which is different from the first downlink component carrier.

2. The method of claim 1, wherein the information in the RRC signal indicates the starting OFDM symbol from which the PDSCH signal is received.

3. The method of claim 1, wherein the information in the RRC signal is commonly applied to a plurality of downlink component carriers.

4. The method of claim 3, further comprising:
   receiving another PDCCH signal on the first downlink component carrier, and
   receiving the PDSCH signal from the starting OFDM symbol on a third downlink component carrier different from the first downlink component carrier.

5. A communication apparatus for receiving a PDSCH (Physical Downlink Shared Channel) signal in a wireless communication system, comprising:
   a RF (Radio Frequency) module; and
   a processor,
   wherein the processor is configured to:
   receive a RRC (Radio Resource Control) signal including information used for identifying a region from which the PDSCH signal is received;
   receive a PDCCH (Physical Downlink Control Channel) signal including resource allocation information for the PDSCH signal; and receive the PDSCH signal from a starting OFDM (Orthogonal Frequency Division Multiplexing) symbol of the region, wherein the PDCCH signal is received on a first downlink component carrier and the PDSCH signal is received on a second downlink component carrier which is different from the first downlink component carrier.

6. The communication apparatus of claim 5, wherein the information in the RRC signal indicates the starting OFDM symbol from which the PDSCH signal is received.

7. The communication apparatus of claim 5, wherein the information in the RRC signal is commonly applied to a plurality of downlink component carriers.

8. The communication apparatus of claim 7, wherein the processor is further configured to receive another PDCCH signal on the first downlink component carrier, and receive the PDSCH signal from the starting OFDM symbol on a third downlink component carrier different from the first downlink component carrier.

9. A method for transmitting a PDSCH (Physical Downlink Shared Channel) signal by a transmitter in a wireless communication system, comprising:

transmitting a RRC (Radio Resource Control) signal including information used for identifying a region from which the PDSCH signal is transmitted;

transmitting a PDCCH (Physical Downlink Control Channel) signal including resource allocation information for the PDSCH signal; and transmitting the PDSCH signal from a starting OFDM (Orthogonal Frequency Division Multiplexing) symbol of the region, wherein the PDCCH signal is transmitted on a first downlink component carrier and the PDSCH signal is transmitted on a second downlink component carrier which is different from the first downlink component carrier.

10. The method of claim 9, wherein the information in the RRC signal indicates the starting OFDM symbol from which the PDSCH signal is received.

11. The method of claim 9, wherein the information in the RRC signal is commonly applied to a plurality of downlink component carriers.

12. The method of claim 11, further comprising:

transmitting another PDCCH signal on the first downlink component carrier, and transmitting the PDSCH signal from the starting OFDM symbol on a third downlink component carrier different from the first downlink component carrier.

13. A transmitter for transmitting a PDSCH (Physical Downlink Shared Channel) signal in a wireless communication system, comprising:

a RF (Radio Frequency) module; and a processor, wherein the processor is configured to:

transmit a RRC (Radio Resource Control) signal including information used for identifying a region from which the PDSCH signal is transmitted;

transmit a PDCCH (Physical Downlink Control Channel) signal including resource allocation information for the PDSCH signal; and transmit the PDSCH signal from a starting OFDM (Orthogonal Frequency Division Multiplexing) symbol of the region, wherein the PDCCH signal is transmitted on a first downlink component carrier and the PDSCH signal is transmitted on a second downlink component carrier which is different from the first downlink component carrier.

14. The transmitter of claim 13, wherein the information in the RRC signal indicates the starting OFDM symbol from which the PDSCH signal is transmitted.

15. The transmitter of claim 13, wherein the information in the RRC signal is commonly applied to a plurality of downlink component carriers.

16. The transmitter of claim 15, wherein the processor is further configured to transmit another PDCCH signal on the first downlink component carrier, and transmit the PDSCH signal from the starting OFDM symbol on a third downlink component carrier different from the first downlink component carrier.

* * * * *